(12) United States Patent
Teichmann et al.

(10) Patent No.: US 8,751,437 B2
(45) Date of Patent: Jun. 10, 2014

(54) SINGLE PERSISTENCE IMPLEMENTATION OF BUSINESS OBJECTS

(71) Applicant: SAP AG, Walldorf (DE)

(72) Inventors: Jan Teichmann, Neustadt/Weinstrasse (DE); Daniel Hutzel, Karlsruhe (DE); Stefan Baeuerle, Rauenberg-Rotenberg (DE); Oliver Jaegle, Lorsch (DE); Abhay Tiple, St. Leon-Rot (DE); Gunther Liebich, Walldorf (DE); Marcel Kassner, Hockenheim (DE); Peter Anselmann, Leimen (DE); Anton Forstreuter, Heidelberg (DE)

(73) Assignee: SAP AG, Walldorf (DE)

( * ) Notice: Subject to any disclaimer, the term of this patent is extended or adjusted under 35 U.S.C. 154(b) by 42 days.

(21) Appl. No.: 13/666,661

(22) Filed: Nov. 1, 2012

(65) Prior Publication Data

US 2014/0122411 A1    May 1, 2014

(51) Int. Cl.
*G06F 17/30* (2006.01)

(52) U.S. Cl.
CPC ...... *G06F 17/3007* (2013.01); *G06F 17/30073* (2013.01); *G06F 17/30091* (2013.01); *G06F 17/30315* (2013.01); *G06F 17/30563* (2013.01); *G06F 17/30592* (2013.01)
USPC ........................................ 707/600; 707/607

(58) Field of Classification Search
CPC .......... G06F 17/30073; G06F 17/3007; G06F 17/30091; G06F 17/30315; G06F 17/30563; G06F 17/30592
USPC ................................ 707/600, 607
See application file for complete search history.

(56) References Cited

U.S. PATENT DOCUMENTS

| | | | |
|---|---|---|---|
| 6,831,668 B2 | 12/2004 | Cras et al. | |
| 8,407,183 B2 * | 3/2013 | Foeldesi et al. | 707/611 |
| 2003/0204534 A1 * | 10/2003 | Hopeman et al. | 707/200 |
| 2007/0136278 A1 * | 6/2007 | Grazioli et al. | 707/6 |
| 2009/0164486 A1 * | 6/2009 | Foeldesi et al. | 707/100 |
| 2009/0240663 A1 * | 9/2009 | Plattner et al. | 707/3 |
| 2011/0161379 A1 * | 6/2011 | Grund et al. | 707/812 |
| 2013/0110766 A1 * | 5/2013 | Promhouse et al. | 707/607 |

OTHER PUBLICATIONS

"Business Object Types," SAP NetWeaver 2004 SPS23, visited Jun. 6, 2012, 2 pages.
"SAP Business ByDesign: Analytics," SAP AG, on or before Jun. 7, 2012, 78 pages.
"Product Documentation, SAP Business ByDesign FP 3.5: Analytics," visited Jun. 7, 2012, 113 pages.
Tuan, "CD 122, Five Essential SAP Business ByDesign Customizing Capabilities That Every Partner Should Know," SAP TechEd, Sep. 2011, 21 pages.
Schneider, "SAP Business ByDesign Studio—Application Development," Galileo Press, Nov. 1, 2011, Chapter 8, 29 pages.

* cited by examiner

*Primary Examiner* — Frantz Coby
(74) *Attorney, Agent, or Firm* — Klarquist Sparkman, LLP

(57) ABSTRACT

Business objects can be implemented in a single persistence scenario that supports both online transaction processing (OLTP) and online analytical processing (OLAP). A consumption-centric approach can use a same business object attribute data format model for consumption and persistence. Also, a singular model can be implemented in different layers of a system processing business objects. Extra software layers can be avoided. A business-objects-based system can take advantage of the technologies to provide greater flexibility, ease of extensibility, and performance improvements.

20 Claims, 12 Drawing Sheets

SINGLE PERSISTENCE IMPLEMENTATION OF BUSINESS OBJECTS

BACKGROUND

As enterprises accumulate ever greater amounts of data on their transactions, processes, products, and operations, online analytical processing has become an essential part of doing business. The number of tools and techniques addressing analytical processing has grown, enabling data analysts to quickly analyze and navigate through vast complex collections of data.

By conventional practice, online analytical processing is traditionally performed on data that is separate from live transactional data. Accordingly, although current approaches provide a wide variety of functionality, they result in complexities related to mapping and persistence. There is therefore room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Online analytical processing and online transaction processing can be performed with a single persistence. Business objects can be supported by the single persistence, and a one-to-one relationship between business object nodes and database tables can be implemented. A framework for implementing the business objects can implement a single data format model. For example, an external format can be used throughout the processing stack when processing or persisting business objects.

As described herein, a variety of other features and advantages can be incorporated into the technologies as desired.

DETAILED DESCRIPTION

Example 1

Exemplary Overview

The technologies described herein can be used for single persistence techniques in a variety of scenarios. Adoption of the technologies can provide efficient actions on data in both OLTP and OLAP scenarios.

The technologies can be helpful for those wishing to reduce the complexities and resources related to systems processing both online transaction processing and online analytical processing. Synchronization and inconsistencies between data can be avoided. Beneficiaries include developers who wish to customize a computing system implementing the technologies. End users can also indirectly benefit from the technologies because changes to the system can be easily implemented to meet user requirements.

Example 2

Figure 1:
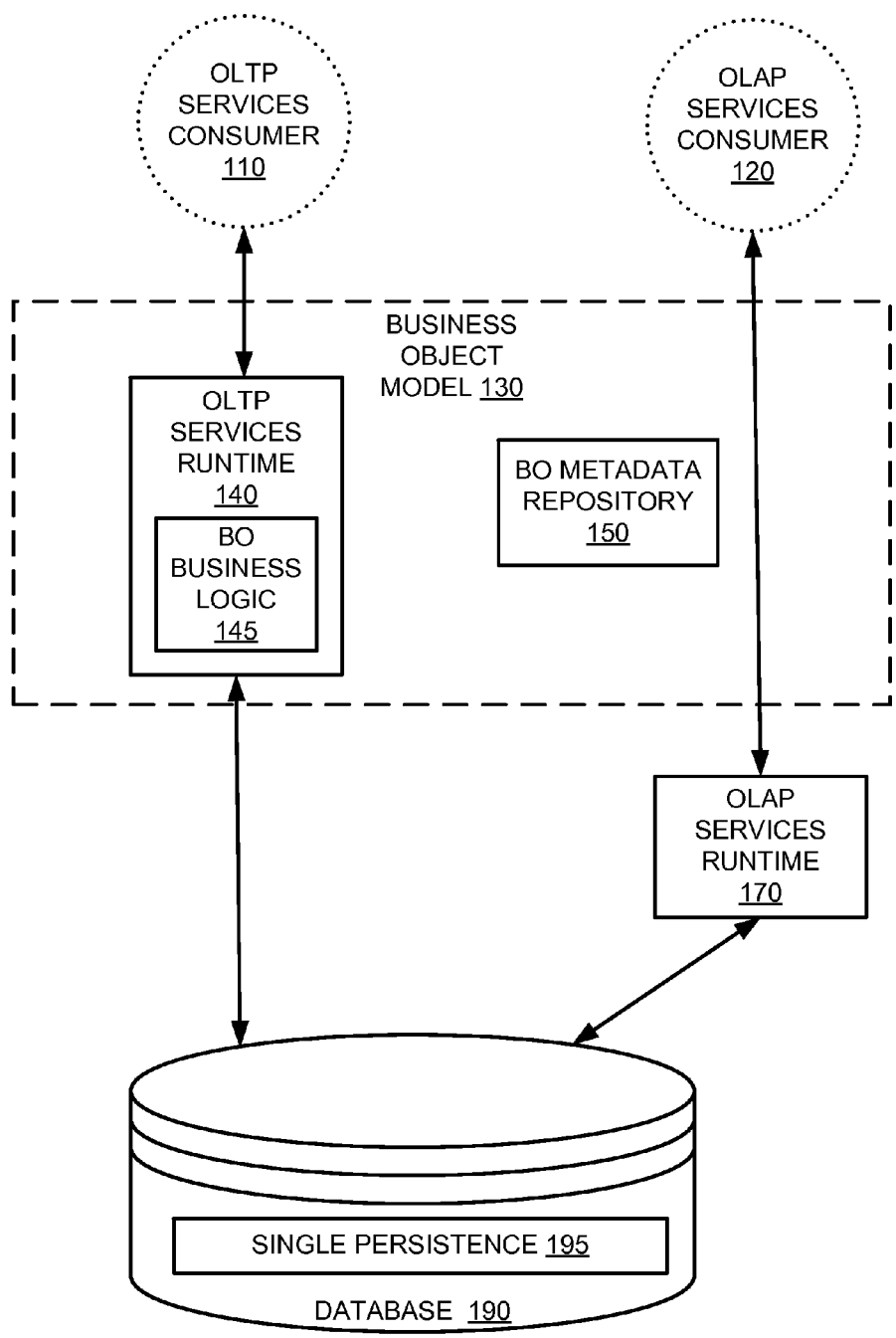
FIG. 1 is a block diagram of an exemplary system implementing a single persistence supporting business objects.

Exemplary System Implementing Single Persistence Supporting Business Objects FIG. 1 is a block diagram of an exemplary system 100 implementing a single persistence supporting business objects as described herein.

In the example, one or more online transaction processing consumers 110 and one or more online analytical processing consumers 120 can be served by the system 100. The consumers 110, 120 are shown for context and need not be implemented as part of the technology.

An online transaction processing (OLTP) services runtime 140 can comprise business object business logic 145 of the supported business objects and is operable to provide OLTP services to consumers 110 via a single persistence 195 stored in a database 190. The aggregated business logic 145 of different business object types can form a business logic layer in the business object model 130 to provide OLTP services to business object consumers. A business object has its own business object implementation in actions, validations, determinations, and the like. Certain business logic can be shared among business objects, such as create, read, update, delete, lock, unlock, transactional behavior, and the like.

An online analytical processing (OLAP) services runtime 170 is operable to provide OLAP services to consumers 120 via the single persistence 195 (e.g., the same single persistence used by the OLTP services runtime 140).

Consumers 110, 120 can access the services 140, 170 according to a business object model 130 that can be used to fulfill OLAP services requests as described herein. The business object model 130 can include conventions for representing different business object types and persisting the attributes of business object instances. For example, business object functionality can be implemented by accessing the business object business logic 145 according to the model. The structure of business objects and relationships between them can be represented in the business object metadata repository 150. Although a business object's metadata logically belongs to the business object, they are stored in the business object metadata repository 150. In this way, the system 100 can support a plurality of business objects.

The database 190 can persist a plurality of business object instances (e.g., of one or more business object types) in one or more computer-readable storage media. Respective of the business object instances can be persisted as a single persistence. For example, both OLAP and OLTP services can be provided with a single persistence; there need not be a separate persistence to fulfill OLAP service requests. OLAP processing can run on the OLTP database without secondary persistence. The database 190 can be implemented to be transaction-safe and support enterprise class database features such as point-in-time recovery, backup and restore, and the like. Higher-level analytical models can be in star-schema shape, but persistence need not be.

In practice, the systems shown herein, such as system 100 can vary in complexity, with additional functionality, more complex components, and the like. For example, additional components can be included to implement security, report design, and the like.

The system 100 and any of the other systems described herein can be implemented in conjunction with any of the hardware components described herein, such as the computing systems described below (e.g., processing units, memory, and the like). In any of the examples herein, the inputs, outputs, and tools can be stored in one or more computer-readable storage media or computer-readable storage devices. The technologies described herein can be generic to the specifics of operating systems or hardware and can be applied in any variety of environments to take advantage of the described features.

Client/server operation can be supported, and cloud computing techniques can be applied to give clients the ability to perform the described techniques via a rich Internet application without concern over the actual computing infrastructure needed or used to operate the servers, which can be administered by a business entity different from the client user.

Example 3

Figure 2:
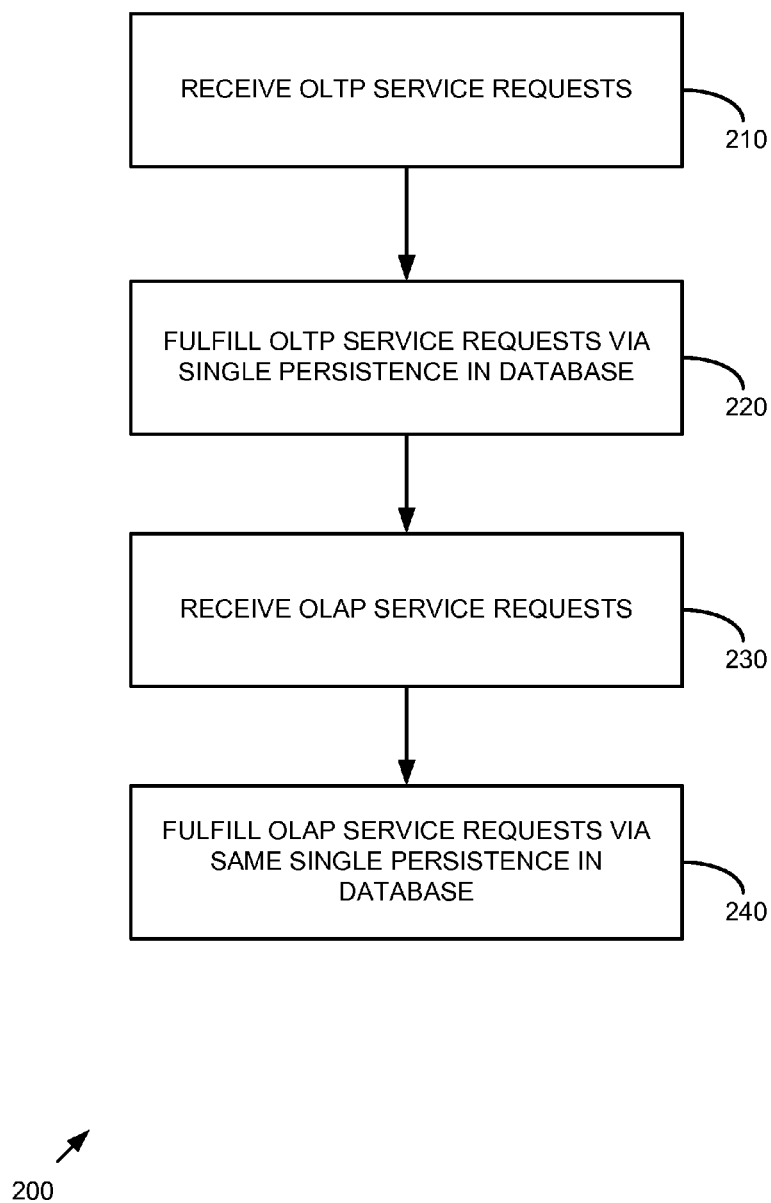
FIG. 2 is a flowchart of an exemplary method of implementing a single persistence supporting business objects.

Exemplary Method Implementing a Single Persistence Supporting Business Objects FIG. 2 is a flowchart of an exemplary method 200 of implementing a single persistence supporting business objects and can be implemented, for example, in the system shown in FIG. 1.

At 210, OLTP service requests are received. Such service requests can comprise one or more business object attributes (e.g., during create, read, update or delete operations on business object instances comprising such attributes).

At 220, the OLTP service requests are fulfilled via a single persistence in a database. Such a persistence can persist the one or more business object attributes (e.g., for those operations for which persisting the attributes is applicable).

At 230, OLAP service requests are received. Such service requests can comprise references to one or more business object attributes (e.g., attribute names for query or other operations related to attributes, such as the attributes involved in the earlier OLTP service requests).

At 240, the OLAP service requests are fulfilled via the single persistence in the database (e.g., the same single persistence used for the OLTP service requests).

After fulfilling the service requests, consumers of the services can display results associated with the requests (e.g., displayed attributes or analytics performed on the attributes).

Although the example shows OLTP processing and OLAP processing done in sequence, other arrangements are possible. For example, the two can be intermixed, done in parallel, or the like. Further OLTP service requests can be received after the OLAP service requests are fulfilled.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4

Exemplary Business Object Consumer

In any of the examples herein, a consumer of business objects can be any software accessing online transaction processing (OLTP), online analytical processing (OLAP), or other services associated with a business object. As described herein, analytical processing can essentially bypass a business logic layer, but still be considered availing itself of the business object framework (e.g., as represented in metadata shared with OLTP).

As described herein, such consumers can execute on any of a variety of computing systems, including cloud-based arrangements, and the like.

Example 5

Exemplary Single Persistence

In any of the examples herein, a single persistence can be used for both OLTP and OLAP. Unlike conventional data warehousing techniques, as soon as a change to a business object is saved, it can be reflected for OLAP, and a second persistence of the data is not needed for OLAP.

Example 6

Exemplary Business Object Support

In any of the examples herein, the technologies can support business objects. For example, a business object services provider can execute at runtime, interpret the business object model, and provide business object services such as implementing business object behaviors, based on the business object model and the metadata associated with the business object type of a business object instance. Such support can be provided by the OLTP services runtime shown herein and can be partly interpreted and partly implemented by code automatically generated according to the business object model (e.g., code implementing default behavior, code implementing customized behavior, or both).

Example 7

Exemplary OLTP Services

In any of the examples herein, create, read, update, and delete functionality can be implemented by an OLTP services runtime. Such functionality can be implemented in a transaction-safe manner and support enterprise class database processing.

A rich set of customizable functionality can be provided. Adopting a single model for dealing with business objects throughout the processing stack can lead to improvements in flexibility and performance. Multiple frameworks can be collapsed into fewer elements. So, for example, more business object behaviors can be automatically generated or modified without having to resort to writing or modifying software code.

For example, an enterprise services framework can be provided that manages transactions according to phases (e.g., initial phase, interaction phase, save phase, and the like). Such services can be used to provide runtime functionality for business objects, such as saving data that has been changed in a user interface (e.g., by having the enterprise services framework coordinate persistence for various business objects involved). Modifications can be done at various exit points, but using a single model for the business objects can avoid complicated mappings between multiple layers.

Lifecycle management for business objects can be simplified by collapsing services into fewer elements via one business object model. For example, a status and action model can indicate whether a business object instance is in revision, completed, active, or the like as the life cycle state of the business object instance. There can also be a consistency status (e.g., consistent, inconsistent, undefined, etc.). The business object model can include default behavior for status transitions.

Additional features of the OLTP services include extensibility. User developers can customize the application suite in a variety of ways. For example, extension attributes (e.g., new fields) can be added to the business object nodes as described herein. The OLTP services can continue to operate, providing default behavior where appropriate (e.g., the extension attributes are persisted during state transitions), but also allowing custom behavior if desired. Such an extensibility framework can be collapsed into another framework (e.g., the enterprise services framework) and use the same business object model (e.g., performing processing on the external format as described herein).

Thus, online transaction processing services runtime can operate as a single layer providing enterprise services for business objects, life cycle management services for business objects, and extension services for business objects. Such services can process business object instances according to a single business object model as described herein. Mappings between different attribute formats can be avoided during such processing. As a further benefit, development can be simplified because different attribute formats need not be used during development (e.g., the same attribute format can be used throughout the above services).

Example 8

Exemplary Business Logic

In any of the examples herein, business logic can be the logic implemented by a business object to perform its operations on data, such as business object attributes. For example, determinations, actions, and validations can be performed to accomplish business process tasks. The aggregated business logic of different business object types can form a business logic layer in the business object model.

Example 9

Exemplary OLAP Services

In any of the examples herein, query and other online analytical processing services can be provided by an online analytical processing services runtime. Such a service can be implemented by a framework that interprets the business object model, including business object metadata.

During development, analytics queries and database views can be modeled. An analytics framework can accept the metadata for a business object and create database access (e.g., for the database views) that is optimized for the OLAP services.

As described herein, consumers can bypass OLTP logic (e.g., the business logic layer) when accessing OLAP services in case no transactional processing is needed.

Example 10

Exemplary Business Object Attributes

In any of the examples herein, business object attributes can take a variety of forms. A business object attribute definition can specify a name and data type for the business object attribute. An instance of the business object then reflects a particular value for the business object attribute (e.g., according to the data type). Such attributes are sometimes called "fields." As described herein, derived attributes can be calculated mathematically or otherwise derived from other attributes.

As described herein, extension attributes (e.g., additional fields sometimes called "extension fields") can be added to a business object type definition to customize a business object. In practice, attributes can be organized by being associated with particular nodes of a business object.

Example 11

Exemplary Business Object Metadata Repository

In any of the examples herein, a business object model can comprise a business object metadata repository that stores business object configuration information (e.g., data describing business objects, their attributes, and relationships between them). Such metadata can be separated from the business object business logic (e.g., be stored as accessible attributes that can be evaluated rather than being executed as code). By splitting some business object configuration information out of the business object business logic, certain aspects of the system can bypass the business logic, resulting in improved performance.

The metadata repository can be used to generate runtime artifacts and serve as a common transport mechanism for design time and runtime entities. The metadata repository can include an API layer to provide uniform read and write APIs to access repository objects; a repository metamodel that supports simple introduction of new repository objects; a repository runtime that provides transactional services to create and administer repository objects; and a persistency layer that allows repository objects to be stored in several storage types, depending on purpose.

The metadata repository runtime can work under a business object processing framework that can be used as an implementation layer for consistency checks, activation of models, and the like.

When building views involving objects, the metadata repository can assist at design time. Logic can be implemented in code in a code editor and saved in a code repository, which can be referenced in the metadata repository.

Example 12

Exemplary Business Object Model

As shown herein, various components of the system can operate according to a single business object model when performing processing related to business objects. For example, the online transaction processing services runtime (e.g., and the business object business logic within it) and the online analytical processing services runtime can use a single model when processing business objects. Additional layers (e.g., a data access layer interposed between a business logic layer and the database to send and receive data) can also adhere to the model.

A single business object model can be implemented by using a single data model throughout the processing stack (e.g., including in the single persistence in the database). For example, a single data format model can be used for business object attributes. In addition, representations of business objects can be split into business logic and metadata as described herein. Various components of the system can access the logic, metadata, or both as needed to fulfill requests for services.

In addition, the system can be extended by the addition of extension attributes as described herein, and the extension attributes can be processed and represented according to the same business object model.

As described herein, the business object model can adhere to a one-to-one relationship between business object nodes and database tables.

Although some of the possible advantages (e.g., mapping avoidance, superior performance, synchronization avoidance) apply at runtime, a single business object model can also provide possible advantages during development. For example, a single programming model can be used when implementing business objects, leading to faster development time, less configuration, and easier modification of the system. Such advantages can be particularly helpful in a software-as-a-service (SaaS) or cloud computing scenario because configuration can be achieved via a rich Internet application rather than conventional coding techniques.

Example 13

Exemplary Single Data Format Model

In any of the examples herein, the business object model can comprise a single data format model that can be implemented in any of the components described. For example, a single, common (e.g., shared) attribute name and a single, common (e.g., shared) attribute data type can be used when referring to a business object attribute throughout the processing stack, from the online transaction services runtime, associated business logic, the online analytical processing services runtime, and in the single persistence in the database. So, instead of having a special, separate name or format for OLAP services, the OLTP name or format can be used (or vice versa).

Nodes are essentially flat because databases typically do not allow for storing tables within tables. To store a 1:n relationship, two nodes and two database tables can be used.

Such an arrangement can lead to significant advantages, such as the ability to bypass the business logic at runtime when fulfilling requests for online analytical processing services. By going direct to the database (e.g., via views on the database), performance can be improved.

Example 14

Exemplary Calculated Fields

In any of the examples herein, a single persistence can include a persisted state of calculated attributes (e.g., attributes that are derived from other attributes by mathematical or algorithmic calculations) for one or more of the business object instances. The business object model can support such an arrangement by persisting such fields when changes are made to any related fields (e.g., fields that are used to calculate the calculated field). During OLAP, such calculated fields need not be calculated because they are persisted in the single persistence.

Example 15

Exemplary Mapped Queries

In any of the examples herein, it may be undesirable to persist certain calculated fields (e.g., an age field that depends on today's date). Instead, a query mapper can map such queries to fit the business object model. In some cases, a query can be inverted. For example, in the case of age, an age query can be mapped to a date-of-birth query or the like.

Such an arrangement allows the business object model to deal with special cases that do not fit with other aspects of the system.

Example 16

Exemplary Nested Data Types

In any of the examples herein, nested data types can be implemented via a flat structure. Multiple data types can be combined into a flat structure. For example, a popular flat data type (e.g., storing administrative data) can be used in many root node structures. As a result, the single fields in the flat data type fits into one database row of the table for the root node. Other combinations are possible.

Example 17

Exemplary Structured Datatypes

Certain data types, such as "amount" can be shown as one column on the user interface, but handled as a structure in the code (e.g., the business object logic) and stored as two separate columns in the database. Thus, database limitations can be overcome.

Such data types can be are stored as two fields, but query (e.g., SQL) mappings make them appear to be one field (e.g., there is a temporary internal format).

Example 18

Exemplary Application Suite

In any of the examples herein, an application suite can take the form of one or more software applications working in concert to perform processing for a business enterprise, whether public, private, or otherwise. Such an application suite can include a wide variety of offerings, such as enterprise resource planning, accounting, financial, human resources, customer relationship management, supplier relationship management, supply chain management, and other software. The suite can include business objects that are used in more than one application in the suite.

As described herein, such an application suite can support both online transaction processing and online analytical processing of the data associated with the applications.

The application suite can be provided in a SaaS scenario taking advantage of cloud computing techniques. Likewise, development can also be similarly achieved. For example, customization of the software can be achieved via a rich Internet application accessing a server in a SaaS scenario taking advantage of cloud computing techniques. In this way, many aspects of software development can be achieved without conventional coding techniques.

Example 19

Exemplary Single Persistence and Single Data Format Model for Business Objects

Figure 3:
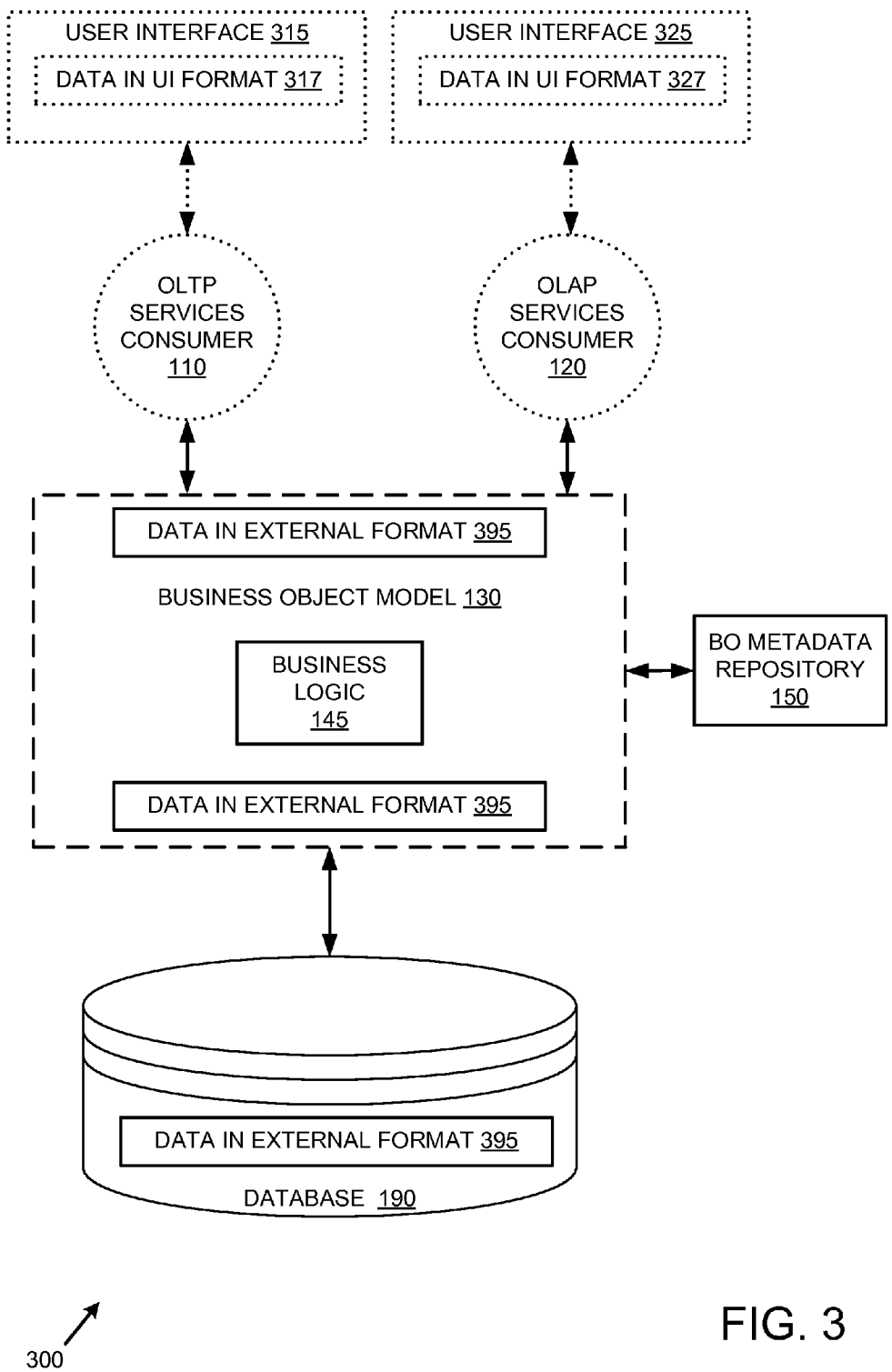
FIG. 3 is a block diagram of an exemplary system implementing a single persistence and a single data format model for business objects.

FIG. 3 is a block diagram of an exemplary system 300 implementing a single persistence and a single data format model for business objects. In the example, both OLTP and OLAP services are provided according to a common business object model 130.

For purposes of context, one or more OLTP 110 consumers and one or more OLAP consumers 120 are shown. Although a single data format model is shown in the system 300, consumers 110, 120 can perform additional formatting on the data and present user interfaces 315, 325 that depict the data in a user interface (e.g., display) format 317, 327.

As shown, the business object model 130 can use data in an external format 395 when interfacing with consumers. In addition, the same external format can be used when interfacing in the other direction (e.g., toward the database 190), whether with the database 190 or other layers interposed between the business object model and the database 190 (e.g., a data access layer or the like).

In some special cases, deviation from the external format can be supported. For example, mapping scripts, mapping aliases, and the like can be used to map data from an external format to some other format for persisting in the database 190.

Example 20

Figure 4:
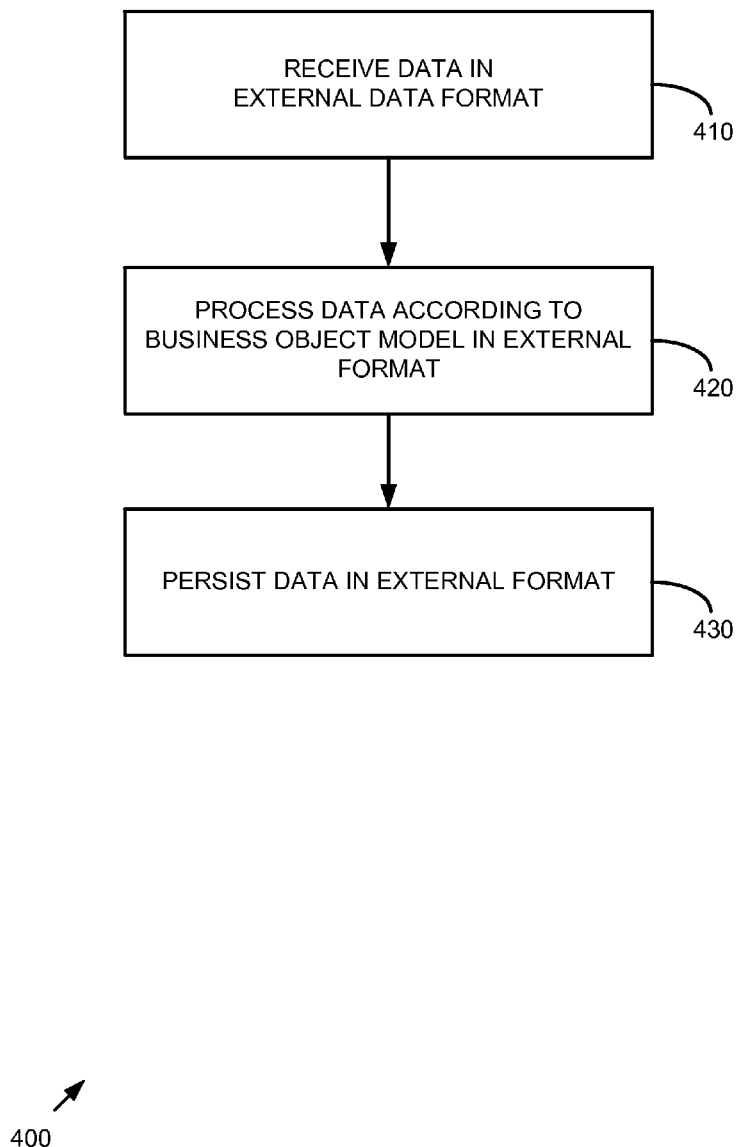
FIG. 4 is a flowchart of an exemplary method implementing a single persistence and a single data format model for business objects.

Exemplary Method of Implementing a Single Persistence and a Single Data Format Model for Business Objects FIG. 4 is a flowchart of an exemplary method 400 implementing a single persistence and a single data format model for business objects and can be implemented, for example, in the system shown in FIG. 3.

At 410, data is received in external format. For example, components of a services runtime executing under the business object model can receive business object attributes in the external format.

At 420, the data is processed according to the business model in external format. For example, in OLTP scenarios, business logic of a business object can perform operations on the data. At 430, the data is persisted in the same external format to the database.

In OLAP scenarios, queries can be run against database views constructed using business object metadata (e.g., which forms part of the business object model). Such queries can use the data (e.g., business object attributes) in external format to query the database, which persists the data in external format. Some database implementations allow for OLAP queries to the database without having stored OLTP data structurally different in a star schema.

Modification of the business object configuration can be reflected in the model, which then applies such modifications to both the OLTP and OLAP scenarios. Thus, business object configurations can be easily modified by a developer.

Example 21

Exemplary External Format

In any of the examples herein, a business object model can use an external format for its data format model. An external format is the format (e.g., attribute name and attribute data type) provided for consumption by consumers of OLTP and OLAP services. As described herein, the data format model can apply throughout the processing stack (e.g., including the single persistence of the database).

OLTP requests can be fulfilled according to the external format; OLAP requests can be fulfilled according to the external format; and the single persistence in the database can be of the external format. Other components of the system (e.g., business logic, business logic layer, data access layer, and the like) can also process (e.g., send, receive, modify, or the like) data using the external format.

Contrary to certain conventional practices of encapsulation, favoring the external format when persisting the business object attributes provides transparency that allows OLAP to directly access the business object attributes without needing details of how the business logic interprets them.

The external format can include a naming scheme (e.g., a single, common name for the same attribute, wherever it may be processed in the stack or database) and a data type scheme (e.g., a single, common data type for the same attribute, wherever it may be processed in the stack or database).

Private attributes can be supported (e.g., persisted in the single persistence) but cleared before the business object attributes are provided to a consumer. To achieve such a result, the private attributes can be annotated or modeled as private.

Example 22

Figure 5:
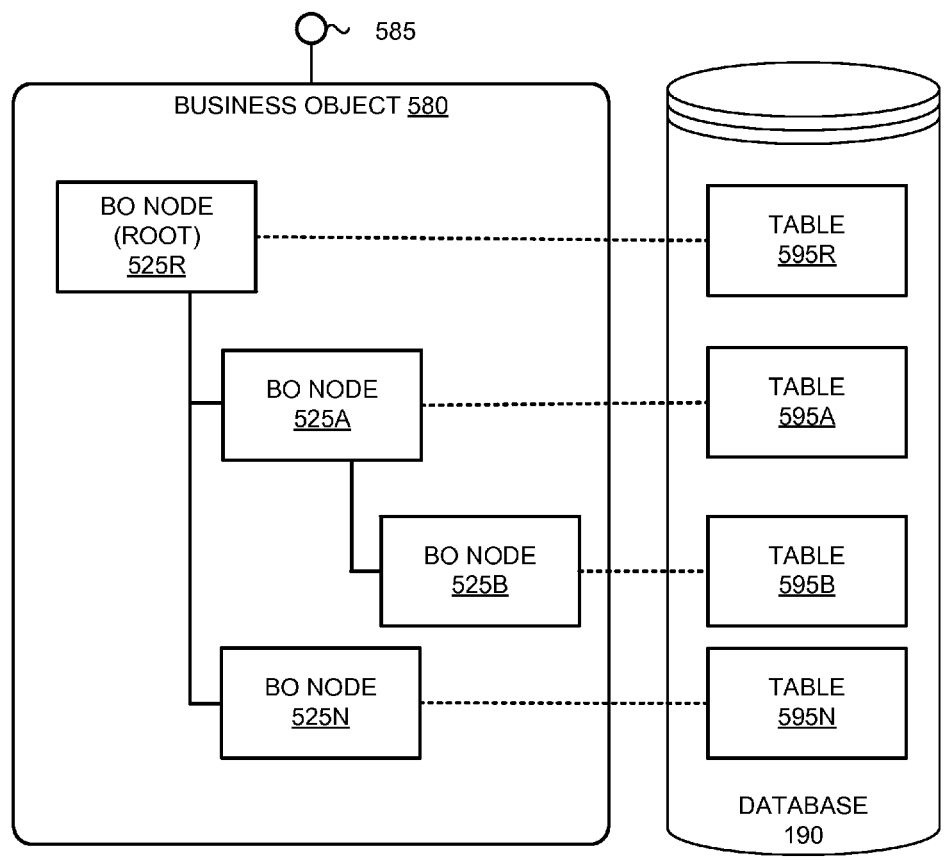
FIG. 5 is a block diagram of a system implementing a one-to-one relationship between business object nodes and database tables in a single persistence scenario.

Exemplary One-to-One Relationship between Business Object Nodes and Database Tables FIG. 5 is a block diagram of an exemplary system 500 implementing a one-to-one relationship between business object nodes 525R, 525A-N and database tables 525R, 595A-N in a single persistence scenario. In the example, a business object 580 (e.g., accessed via interface 585) comprises one or more business object nodes 525A-N. The business object nodes 525R, 525A-N have state (e.g., business object attributes) that are persisted (e.g., stored) in respective tables 595R, 595A-N in a database 190. In practice, the nodes can be stored in a hierarchy so that some nodes (e.g., 525B) are hierarchically underneath others (e.g., 525A). A root node 525R can be uniformly included in business objects for the sake of consistency.

Maintaining such a one-to-one relationship can facilitate OLAP processing on the business objects because persistence scheme idiosyncrasies of the business object are avoided (e.g., the persistence scheme transparently follows the business object node structure). Thus, the OLAP processing need not go through the business object logic and can instead go directly to the table structure, resulting in more easily understandable access and better performance.

Example 23

Figure 6:
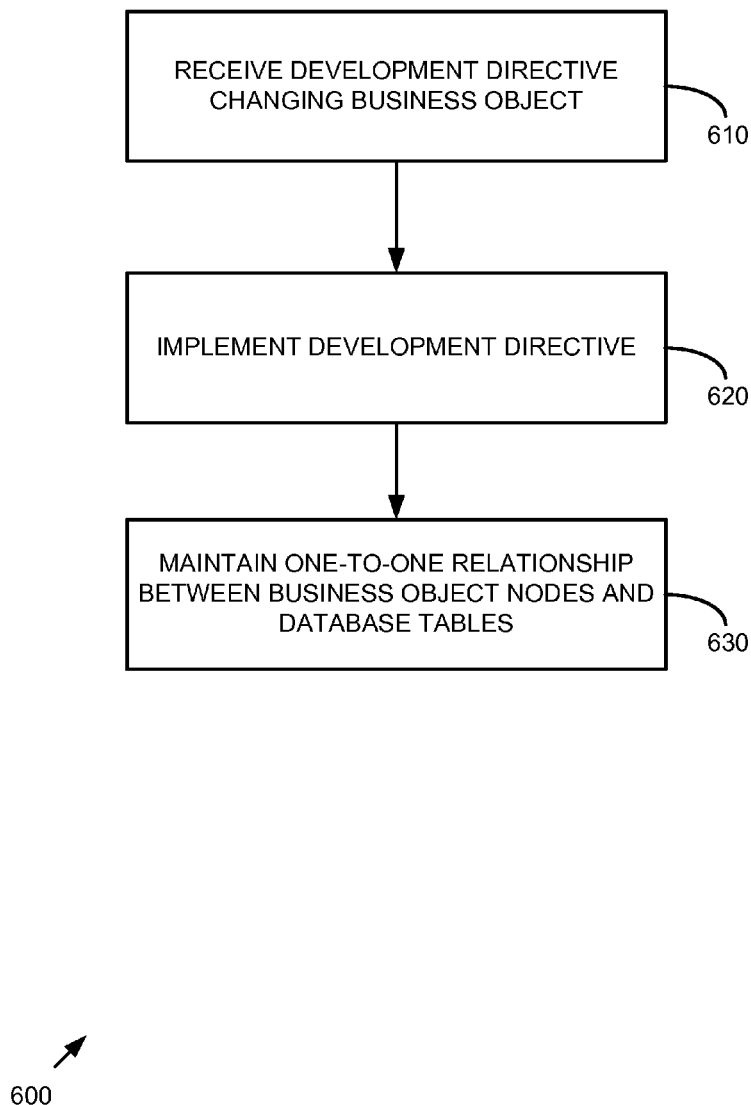
FIG. 6 is a flowchart of an exemplary method implementing a one-to-one relationship in a development scenario.

Exemplary Method of Maintaining One-to-One Relationship Between Business Object Nodes and Database Tables FIG. 6 is a flowchart of an exemplary method 600 implementing a one-to-one relationship between business object nodes and database tables in a development scenario and can be implemented, for example, in the system shown in FIG. 5, or the like. In any of the examples herein, a business object can comprise one or more business object nodes, and a one-to-one relationship can be maintained between business object nodes and tables in the database, even if business objects are customized by changes.

At 610, a development directive changing the business object is received. For example, such a development directive can take the form of adding an extension attribute (e.g., new attribute) to the business object (e.g., to one of the business object nodes of the business object type definition). As described herein, such directives can be accomplished by a user taking advantage of a rich Internet application interface.

At 610, the development directive is implemented. As described herein, the directive can be implemented in a SaaS or cloud computing scenario, and subsequent processing and storage of the changed business object is implemented in such a scenario. Implementing the directive can include automatically putting default behavior (e.g., persistence behavior or the like) into place by generating business logic and modifying the business object metadata (e.g., without coding).

At 630, a one-to-one relationship is maintained between the business object nodes and database tables (e.g., as shown in FIG. 5).

Having the same structure or model on the database can be useful when writing stored procedure code in the database because typically only the database tables are known, not the models. So, such processing becomes easier, and can be done without coding on entities other than the ones in the model.

Example 24

Exemplary Business Object Nodes

In any of the examples herein, a business object can comprise one or more business object nodes. Although any number of arrangements is possible, a hierarchical arrangement can provide certain advantages. For example, a root node can be defined as a starting point when interacting with an instance of the business object. Further nodes (e.g., item nodes, etc.) can be defined under the root.

A business object node can have one or more attributes and also specify associations (e.g., foreign keys). The node can also have associated behavior in the form of actions or methods. For example, an item node may have actions called "approve," "reject," "copy," or the like.

Pre-configured business objects can have nodes that already perform expected behavior (e.g., create, read, update, and delete) from when they are first provided to a developer (e.g., by default, in an out-of-the-box situation). Such an approach promotes uniformity and avoids errors in code, and also makes the system easier to support. Even newly created business objects can have default functionality (e.g., including persistence functionality) generated upon development, avoiding coding by the developer.

Example 25

Figure 7:
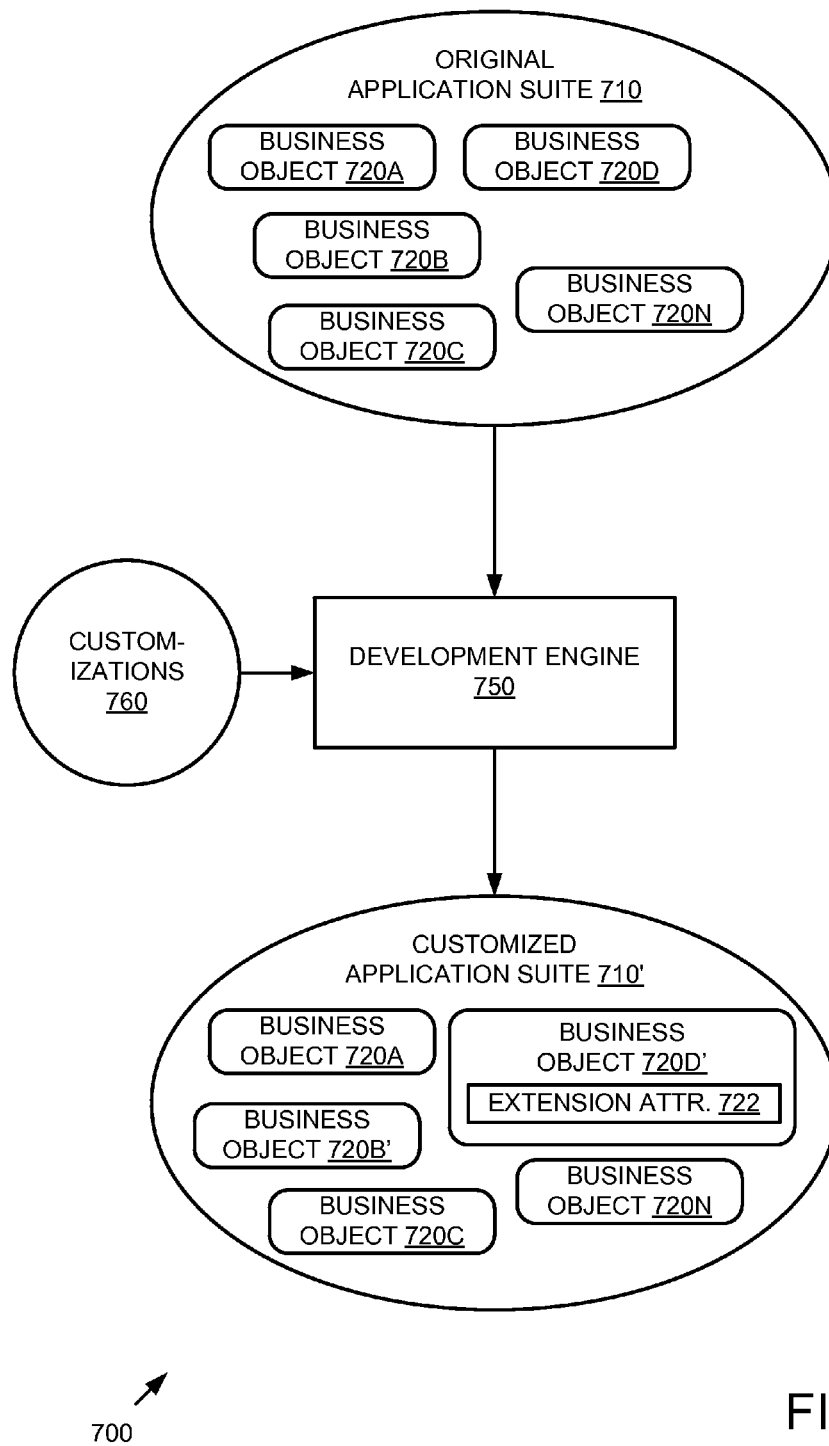
FIG. 7 is a block diagram of a system implementing a customized application suite with business objects having extension attributes.

Exemplary System Implementing Customized Application Suite with Business Objects having Extension Attributes FIG. 7 is a block diagram of an exemplary system 700 implementing a customized application suite with business objects having extension attributes. In the example, a development engine 750 receives customizations 760 (e.g., from a rich Internet application that can be provided as part of a cloud computing solution) that specify extension attributes are to be added to the business object definitions 720A-N of an original application suite 710.

The development engine is operable to output a customized application suite 710' (e.g., a customized version of the suite 710). As shown, some of the business object definitions 720B' and 720D' have been modified by the customizations. For example, an extension attribute 722 is added to the business object definition 720D, resulting in modified business object definition 720D'. Such an extension attribute can take the form of a business object attribute added to one of the business object nodes of the business object definition 720D.

After having added such an extension attribute, the business logic of the application suite can be automatically altered by the development engine 750 so that persistence and other functionality for the modified business objects (e.g., including the extension attribute 722) is provided without further development effort by the customizing user. Further, OLAP processing can incorporate the modifications so that queries and analytics can be performed with the extension attribute 722 without further development effort by the customizing user. The business object metadata repository can be updated by the development engine 750 to reflect that the extension attribute 722 is a part of the business object definition 720. As a result, the attribute 722 can be incorporated into OLAP processing (e.g., appear in user interfaces as dimensions, values, and the like).

During activation of an extension attribute, it can be asked in which OLTP user interfaces and OLAP reports the extension field is to appear. After selected by a user, the rest is generated based on the available metadata.

Example 26

Figure 8:
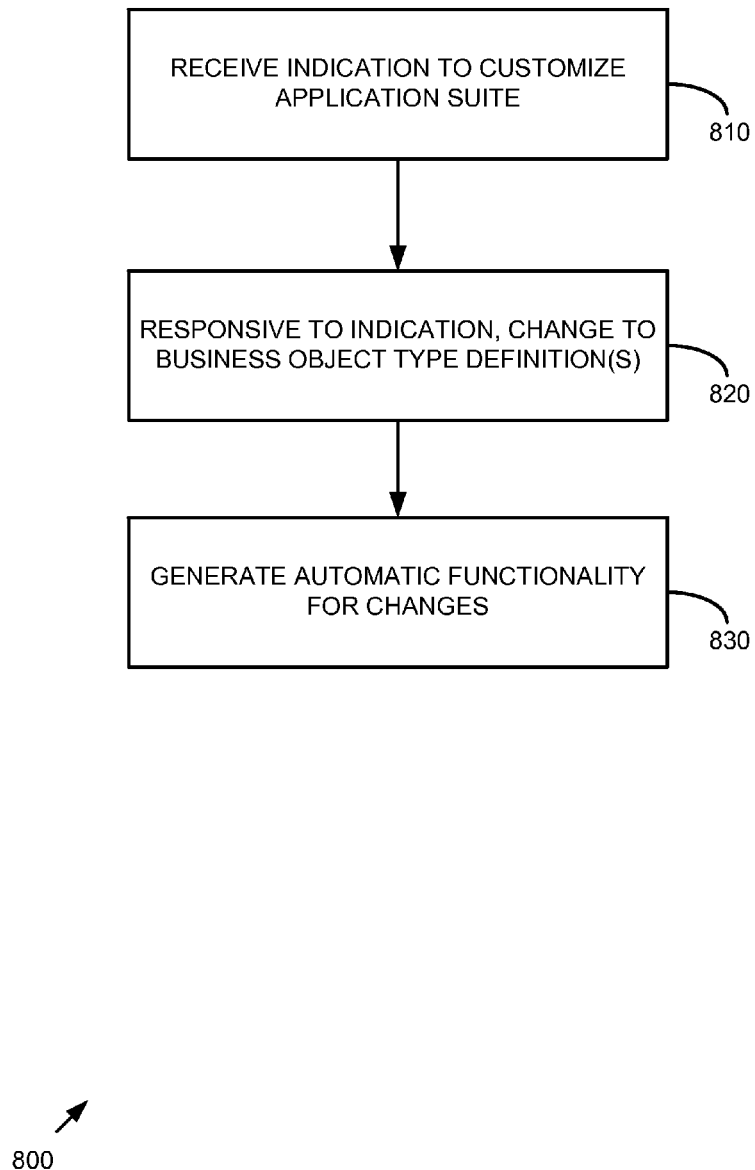
FIG. 8 is a flowchart of an exemplary method implementing a customized application suite with business objects having extension attributes.

Exemplary Method of Implementing Customized Application Suite with Business Objects having Extension Attributes FIG. 8 is a flowchart of an exemplary method 800 implementing a customized application suite with business objects having extension attributes.

At 810, an indication to implement a customization of an application suite is received. For example, an indication to add an extension to a business object node of a business object definition can be received (e.g., indicating the name of the field and a type of the field). Types, logic, and metadata can be adapted.

At 820, responsive to the indication, changes are made to the business object type definitions (e.g., stored in a business object metadata repository) that implement the customization. Existing business object instances can also be modified as appropriate. For example, in the case of adding an extension attribute, business object logic and metadata can be modified as described herein.

At 830, automatic functionality for the changes are generated. In the case of an extension attribute, facilities for OLTP and OLAP functionality (e.g., default code) as described herein can be automatically generated without further development effort by the modifying user. As described herein, the business logic and business object metadata repository can be modified to achieve such functionality, including persistence functionality as described herein.

Example 27

Exemplary System Implementing Database Views for OLAP

Figure 9:
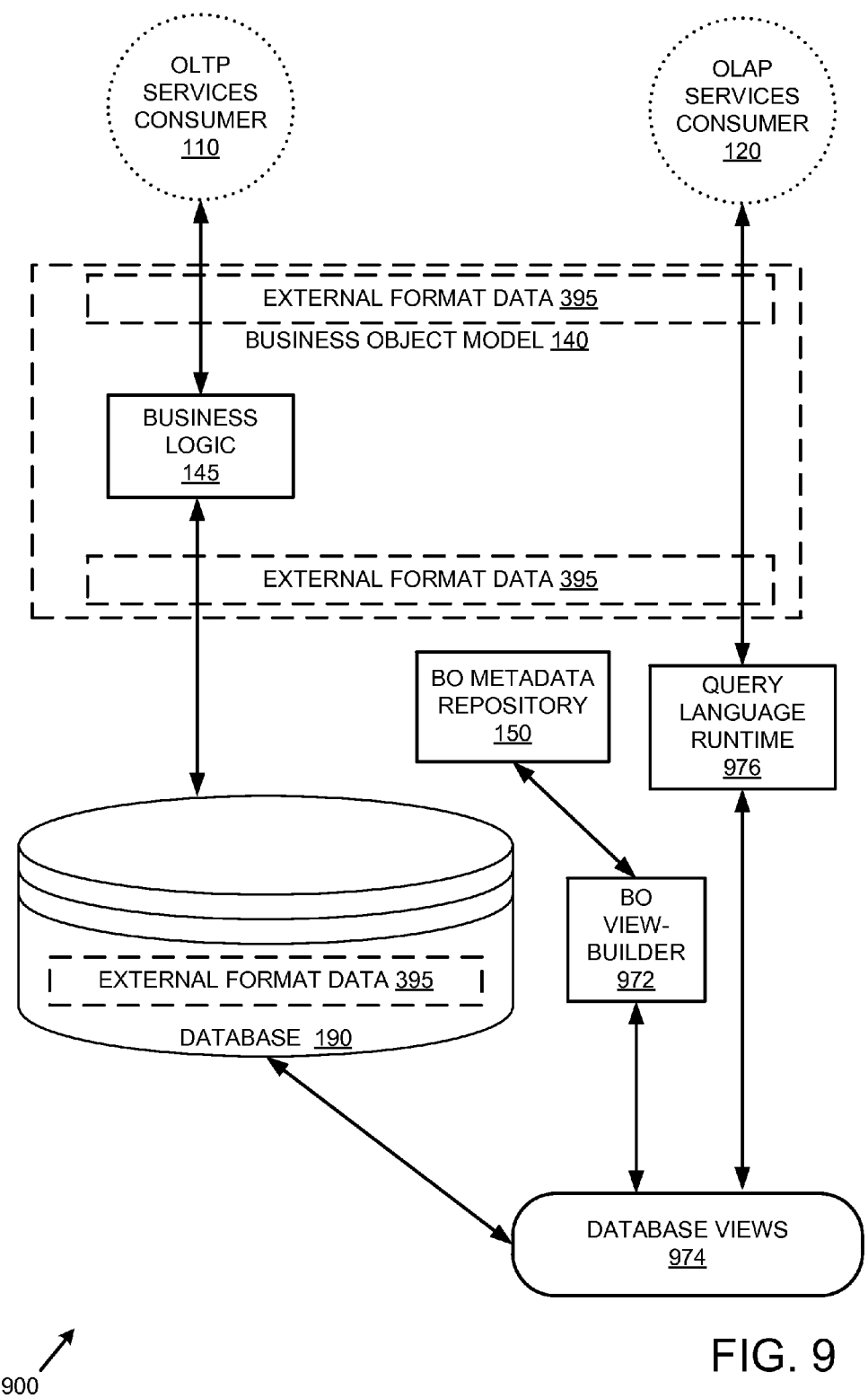
FIG. 9 is a block diagram of an exemplary system implementing a single persistence and a single data format model for business objects with database views for online analytical processing.

FIG. 9 is a block diagram of an exemplary system 900 implementing a single persistence and a single data format for business objects with database views for online analytical processing. In the example, the system 900 provides OLTP and OLAP services to consumers 110, 120, which are shown for context. As described herein, consumers can format the external format data according to specification (e.g., for display in a user interface).

The business object model 140 can be those as shown in FIG. 1 and FIG. 3, including interfacing in external format data 395. In addition, the system 900 can comprise a business object view builder 972 that constructs database views 974 from the database 190 based on the business object metadata repository 150 (e.g., to provide views appropriate for querying and other OLAP functionality). OLAP functionality still depends on the single persistence (e.g., external format data 395) in the database 190, which is also used for OLTP functionality.

The query language runtime 976 can also be used by OLTP services consumer 110.

The business object metadata repository can also affect OLTP processing. In the metadata repository, the structure of the business object is modeled. Therefore, the repository can serve as a basis for any retrieval (or creation, update, deletion, etc.) in OLTP processing. Further, other actions are also modeled in the repository. So, any user interface that deals with single instances of a business object and processes can draw on the metadata repository as part of OLTP processing.

Example 28

Exemplary Method Implementing Database Views for OLAP

Figure 10:
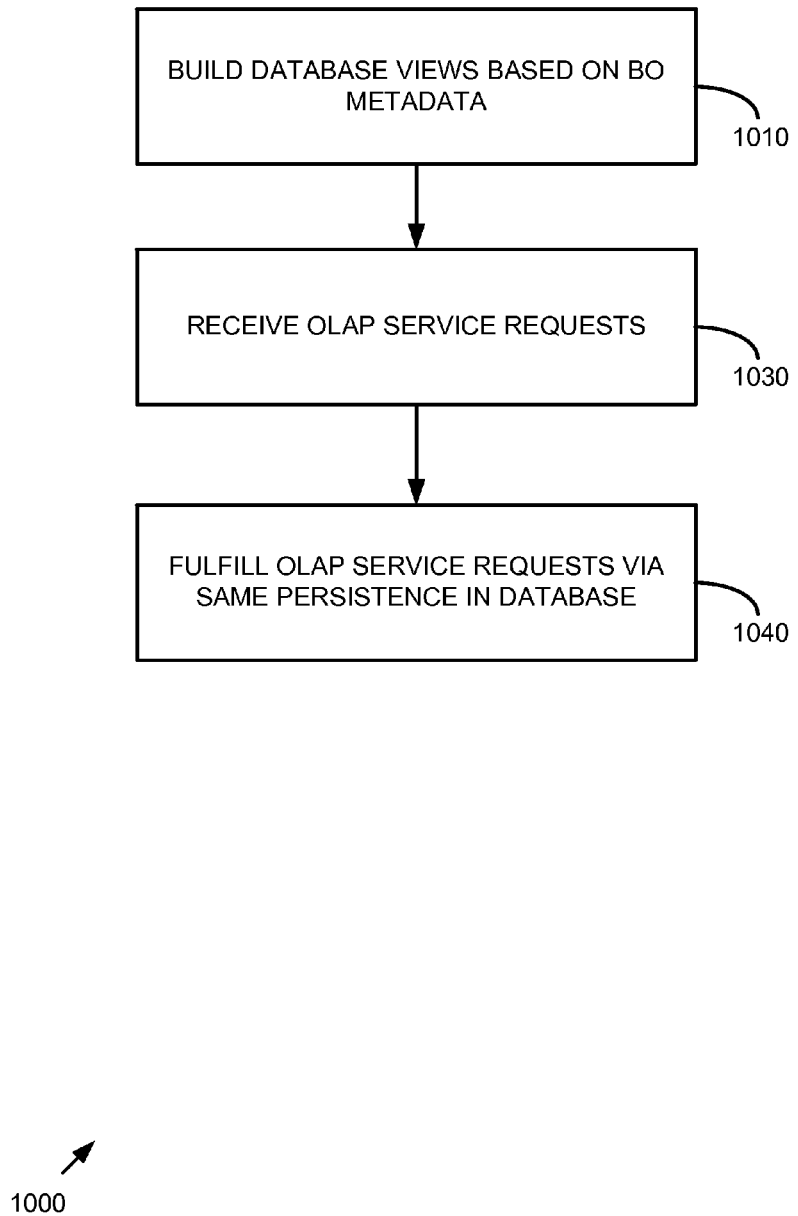
FIG. 10 is a flowchart of an exemplary method implementing a single persistence and a single data format for business objects with database views for online analytical processing.

FIG. 10 is a flowchart of an exemplary method 1000 implementing a single persistence and a single data format model for business objects with database views for online analytical processing and can be implemented, for example, in the system shown in FIG. 9. One or more acts shown for the method 1000 can be performed before runtime or in the background to facilitate OLAP requests that are received at runtime. OLAP is often based on views on the business object data in a single persistence model, but the request a runtime does not require preprocessing or batch processing. Although such processing can be used for some types of calculated fields that are calculated and stored.

At 1010, database views are built based on the business object metadata repository. In the case of customizations, such as new attributes, the views can incorporate such new attributes (e.g., as dimensions, values, or the like).

At 1030, OLAP service requests are received.

At 1040, the OLAP service requests are fulfilled via the same persistence in the database as that used for OLTP (e.g., via the constructed database views).

Example 29

Exemplary Business Objects

Figure 11:
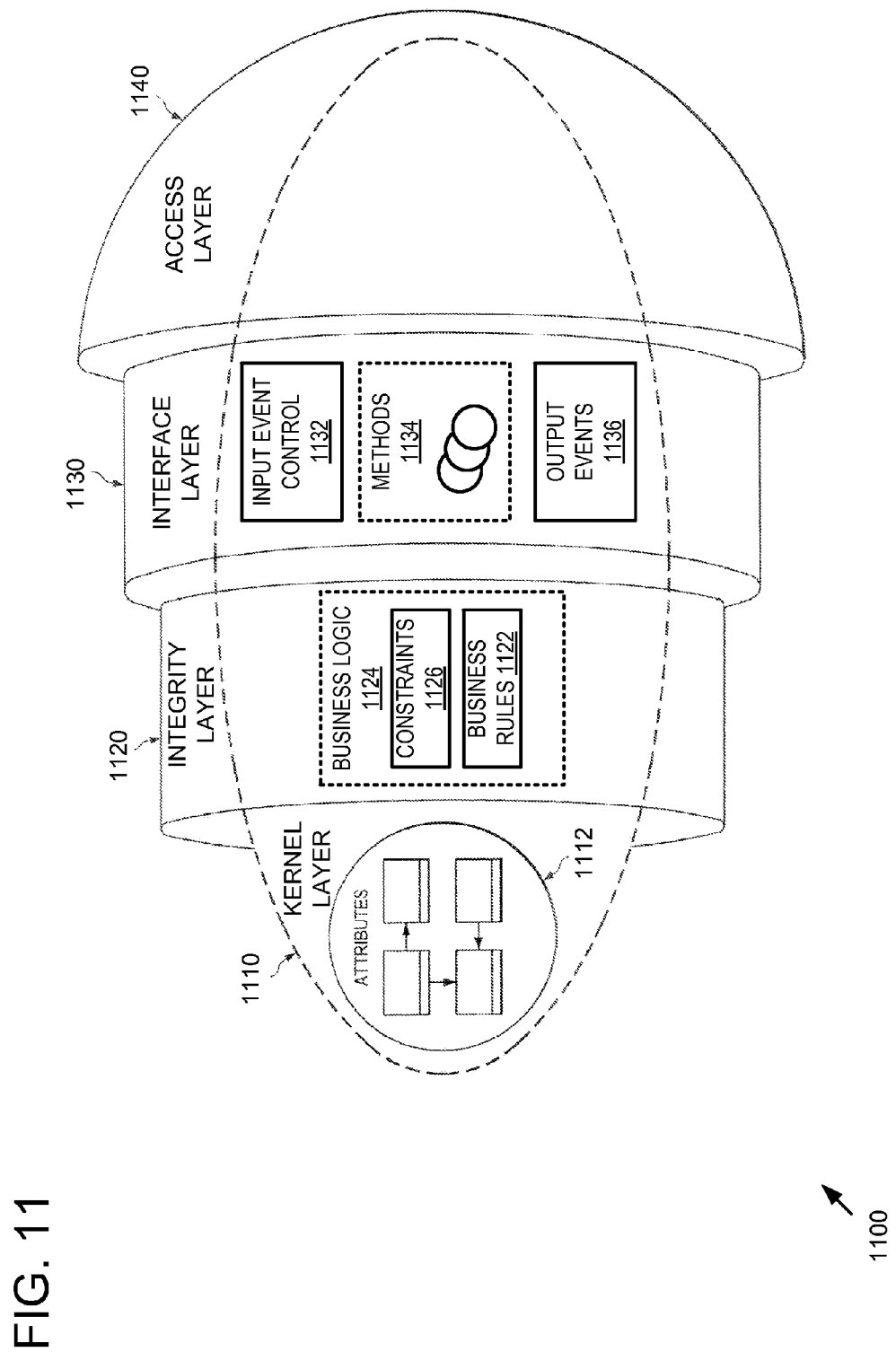
FIG. 11 is a block diagram of an exemplary business object.

FIG. 11 is a block diagram of an exemplary business object 1100. In any of the examples herein, a business object can take the form of a programmatic object that holds a set of instance variables (e.g., attributes, values, properties, characteristics, or the like). Associations between business objects of different types can be stored in metadata (e.g., as part of a data model), which results in a collection of business objects representing business relationships. The business object can be a software model representing real-world items used in a business transaction. For example, a business object may represent a business document (e.g., sales order, purchase order, production order, invoice, etc.), master data objects (e.g., product, business partner, employee, piece of equipment, etc.), or the like. In the case of a product, the business object instance can represent an actual product (e.g., with attribute values for an identifier, price, description, length, volume, or the like).

In any of the examples herein, a universe of business objects can be created and configured to operate in concert in a particular problem domain. As described herein, extension attributes and other customization techniques can be used to tailor a universe of business objects to a specific implementation. Such customizations can be achieved in many cases without coding on the part of the developer.

Business objects can support behaviors via invocation of one or more business object programmatic actions (e.g., programmatic methods), through which clients of the business objects can perform operations on the business object (e.g., on the instance variables). Such actions are typically provided via a programmatic interface that supports one or more parameters that perform a task associated with the action (e.g., cancel an order, hire an employee, change a customer classification, create a target group, and the like).

In the example, the business object 1100 can be defined to contain multiple layers. Exemplary layers include a kernel layer 1110, which represents the object's inherent data, comprising attributes 1112 of the defined business object. An integrity layer 1120 can contain the business logic 1124, which can include business rules 1122 for consistent embedding in the system and the constraints 1126 regarding the values and domains that apply. For example, business logic 1124 can comprise statements that define or constrain some aspect of the business, such that they are intended to assert business structure or to control or influence the behavior of the business entity. It may pertain to the facts recorded on data and constraints on changes to the data. The business logic 1124 can thus determine what data may or may not be recorded in the business object 1100.

The interface layer 1130 can supply valid options for accessing the business object 1100 and describe the implementation, structure, and interface of the business object to the outside world (e.g., the analytical report tool described herein). The interface layer 1130 typically contains programmatic methods 1134 (e.g., invocable to perform the actions described herein), input event controls 1132, and output events 1136.

The access layer 1140 can define the technologies that can be used for external access to the business object's data. Possible technologies can include Hypertext Transfer Protocol (HTTP), Java, COM/DCOM/COM+/.NET (e.g., based on the Component Object Model of Microsoft Corporation), CORBA (Common Object Request Broker Architecture), RFC (Remote Function Call), and the like. Additionally, the business object can implement object-oriented technologies such as encapsulation, inheritance, polymorphism, or combinations thereof.

A special case of a business object called a "business configuration object" (BCO) can be used when actions are not needed. For example, a code list (e.g., list of possible selections for an attribute) can be implemented as a BCO. BCO instances can be delivered to a customer via a business configuration schema technique. Any number of other BCO implementations are possible (e.g., PartyDeterminationRule, PurchasingContractExpiryNotificationSpecification, TripServiceProvider, PublicHolidayProperties, or the like).

Systems that employ business objects in an intelligent way can offer a rich set of reusability to non-technical users because the business objects can represent easily understandable real-world items such as an order, customer, supplier, invoice, and the like. Similarly, actions on the business objects can reflect real-world tasks (e.g., business processes, etc.) as described here.

Example 30

Exemplary Online Analytical Processing

In any of the examples herein, online analytical processing (OLAP) can be used as a tool to explore data sources (e.g., typically data base tables combined by joins, unions, or the like). In practice, online analytical processing involves multi-dimensional analytics, dimensional models, star schemas, snowflake schemas, data cubes, pivot tables, or the like.

An online analytical processing session can be based on an analytical report, which specifies data sources and relationships between such sources for the analytical report. As described herein, an OLAP session can be constructed with reference to a data model that includes at least one business object designated to model data from a data source.

Upon activation of the analytical report, an online analytical processing session begins. The session can then support navigation within the data (e.g., adding or removing certain dimensions, drilling down, slicing and dicing, consolidating data via rollups and aggregation, and the like). Thus, the data model allows ad-hoc navigation throughout the data. In the case of warehoused data such as a data cube, the user can navigate the data throughout the cube.

Although the data used for online analytical processing is traditionally separated from that used in online transaction processing (e.g., into a data warehouse), it is possible to support online analytical processing that draws from the same data sources as those used for online transaction processing.

Example 31

Exemplary Developers

In any of the examples herein, a developer can be any party or entity developing reports for access by users. Developers can include both external developers (e.g., who initially design the system for use and customization by customers) and internal developers (e.g., customer-level developers who customize and/or extend the system for use by internal customers). As described herein, customization by internal developers can be greatly simplified in many cases by avoiding the need for software coding. Default functionality and behaviors can be provided during customization.

Example 32

Exemplary Computing Systems

Figure 12:
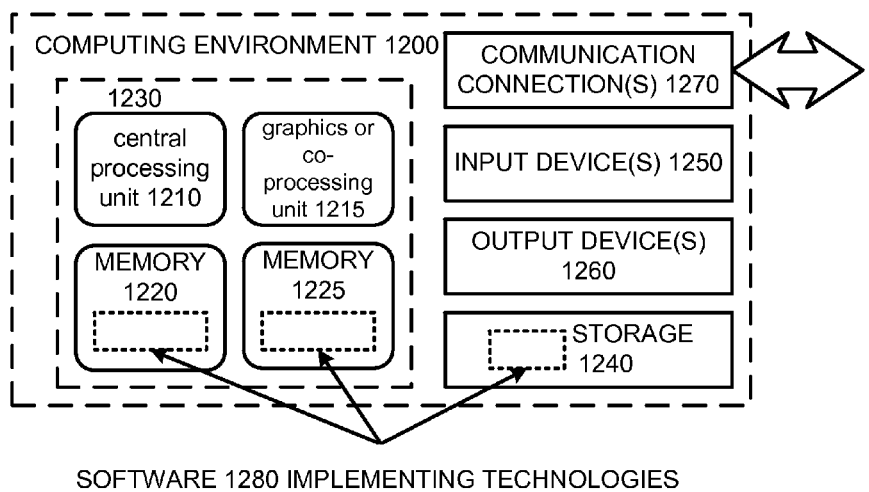
FIG. 12 is a diagram of an exemplary computing system in which described embodiments can be implemented.

FIG. 12 illustrates a generalized example of a suitable computing system 1200 in which several of the described innovations may be implemented. The computing system 1200 is not intended to suggest any limitation as to scope of use or functionality, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s). The memory 1220, 1225 stores software 1280 implementing one or more innovations described herein, in the form of computer-executable instructions suitable for execution by the processing unit(s).

A computing system may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. For video encoding, the input device(s) 1250 may be a camera, video card, TV tuner card, or similar device that accepts video input in analog or digital form, or a CD-ROM or CD-RW that reads video samples into the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 33

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A data processing system supporting a plurality of business objects, the system comprising:
    a database persisting a plurality of business object instances in one or more computer-readable storage media, respective of the business object instances being persisted as a single persistence;
    an online transaction processing services runtime comprising business logic of the business objects and operable to provide online transaction processing services to online transaction processing consumers via the single persistence; and
    an online analytical processing services runtime operable to provide business object online analytical processing services to business object online analytical processing consumers via the single persistence.

2. The system of claim 1 wherein:
the online transaction processing services runtime and the online analytical processing services runtime operate according to a single business object model for the business objects.

3. The system of claim 2 wherein:
the online transaction processing services runtime operates as a single layer providing enterprise services for business objects, life cycle management services for business objects, and extension services for business objects.

4. The system of claim 2 wherein:
the online transaction processing services runtime avoids mapping between different attribute formats.

5. The system of claim 2 wherein:
the data processing system further comprises extension attributes; and
the extension attributes are processed according to the single business object model for the business objects.

6. The system of claim 2 wherein:
the single business object model comprises a common name for a same business object attribute throughout processing.

7. The system of claim 2 wherein:
the single business object model comprises a common data type for a same business object attribute throughout processing.

8. The system of claim 2 wherein:
the single business object model comprises a one-to-one relationship between nodes of the business objects and tables of the database.

9. The system of claim 1 wherein:
the single persistence comprises a persisted state of calculated attributes for one or more of the business object instances.

10. The system of claim 1 wherein:
the online analytical processing services runtime comprises a query mapper operable to map incoming queries.

11. The system of claim 1 further comprising:
a business object metadata repository separate from the business logic of the business objects, wherein the business object metadata repository comprises business object configuration information.

12. A method implemented at least in part by a computer, the method comprising:
receiving online transaction processing requests comprising one or more business object attributes of one or more business objects;
fulfilling the online transaction processing requests via a single persistence in a database, wherein the single persistence in the database persists the one or more business object attributes;
receiving online analytical processing requests comprising references to the one or more business object attributes; and fulfilling the online analytical processing requests via the same single persistence in the database.

13. The method of claim 12 wherein:
the online transaction processing requests are fulfilled according to an external format;
the online analytical processing requests are fulfilled according to an external format; and
the single persistence in the database is of the external format.

14. The method of claim 12 wherein:
the online transaction processing requests are fulfilled according to a naming scheme of the business object attributes;
the online analytical processing requests are fulfilled according to the same naming scheme of the business object attributes; and
the single persistence in the database is according to the same naming scheme of the business object attributes.

15. The method of claim 12 wherein:
the online transaction processing requests are fulfilled according to a data type scheme of the business object attributes;
the online analytical processing requests are fulfilled according to the same data type scheme of the business object attributes; and the single persistence in the database is according to the same data type scheme of the business object attributes.

16. The method of claim 12 wherein:
the business objects comprise one or more business object nodes; and
the method further comprises:
maintaining a one-to-one relationship between business object nodes and tables in the database.

17. The method of claim 12 further comprising:
receiving a development directive to add a new attribute to a business object type definition;
implementing the development directive; and
maintaining a one-to-one relationship between business object nodes and database tables in the single persistence.

18. The method of claim 12 wherein the business objects are part of an application suite, the method further comprising:
in a software-as-a-service scenario, receiving an indication to implement a customization of the application suite;
responsive to the indication, changing one or more business object type definitions; and
automatically generating default functionality for the customization, wherein the default functionality comprises persistence functionality.

19. The method of claim 18 wherein the customization comprises adding a new attribute to a business object, the method further comprising:
building a database view of the single persistence incorporating the new attribute; and
fulfilling an online analytical processing request comprising the new attribute.

20. A system processing requests to a universe of a plurality of business objects accessing a database, the system comprising:
one or more processors;
memory;
a business logic layer receiving requests from one or more business object consumers and operable to send and receive data in an external format to and from the business object consumers;
a data access layer operable to send and receive data from the business logic layer in the external format and send and receive data to a database table system; and
an online analytical processing services runtime operable to send and receive data in an external format to and from one or more online analytical processing services consumers;
a database storing business object attributes of the business objects in external format;
wherein the business logic layer, the data access layer, and the online analytical processing service operate according to a single business object model implementing a single data format model using the external format for attributes of the business objects.

* * * * *